2,899,456

ESTERS OF HYDROXY PHOSPHONIC ACIDS AND ALKENE PHOSPHATES

Jacob Rosin, Maplewood, and Joseph Haus, Clifton, N.J., assignors to Montrose Chemical Company, a corporation of Delaware No Drawing. Application September 13, 1956
Serial No. 609,515

6 Claims. (Cl. 260—461)

This application is a continuation-in-part of our applications Serial Nos. 513,142 and 513,143, both filed June 3, 1955.

This invention relates to a process for preparation of esters of hydroxy phosphonic acids of the general formula:

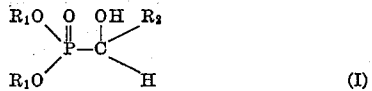  (I)

The invention also relates to the preparation of alkene phosphates of the general formula:

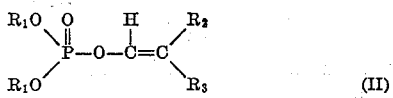  (II)

In both of the formulas, the Rs may be the same or different alkyl radicals, preferably containing from one to six carbon atoms, as well as such radicals containing substituents such as halogen, nitro, amino, hydroxy, alkoxy, mercapto, carbonyl, carboxy, thiocyano and the like. In Formula II, $R_2$ and $R_3$ may also be halogen, nitro, amino, hydroxy, alkoxy, mercapto, thiocyano or like radicals.

The classical procedure for preparation of the esters, I, as described in U.S. Patent 2,579,810, consists in reacting a phosphite diester with a carbonyl compound in the presence of a basic catalyst. Although this reaction does not present any particular problem, the preparation of one of the raw materials used, namely, the phosphite diester, does present one. Although it is known to react the ester I with mild alkali to obtain the phosphate II, we have found that it is not necessary to isolate or purify the crude reaction mixture obtained from the first step of the reaction and that the phosphate II may be directly obtained in what amounts to a single step procedure, without intermediate purification or the like.

The phosphite diesters are generally prepared by interaction of $PCl_3$ with an alcohol; in the course of this reaction the generated hydrogen chloride tends to react with the phosphite diester, decomposing the diester with formation of an alkyl chloride, thus lowering the yield. Various means have been suggested to reduce the amount of hydrogen chloride present during the reaction, but each of these has been cumbersome and complicated, requiring large volumes of materials and low temperatures and, especially in the case of lower alkyl homologues, none of them has resulted in sufficient yield improvement to warrant the additional complication in procedure.

It is an object of this invention to provide a novel process for the preparation of substituted hydroxyalkylphosphonic acid esters in which the difficulties mentioned above are avoided and in which the preparation of the dialkyl phosphite and its condensation with the aldehyde are combined in a single reaction.

It is a further object of this invention to provide a novel and simple process for preparing the alkene phosphates without the necessity of utilizing purified starting materials.

Instead of reacting $PCl_3$ with an alcohol, we react $PCl_3$ with a suitable hemiacetal

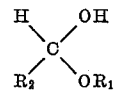

We have found that the reaction taking place can be represented thus:

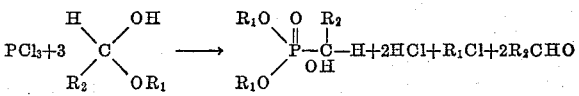

Although this invention is not predicated on any theory of its operation, we believe the probable mechanism of the reaction is as follows:

In the hemiacetal there is an equilibrium

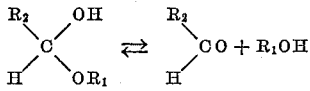

At room temperature and below, the equilibrium is towards the left and very little free alcohol is present. On addition of $PCl_3$ at a relatively low temperature, no reaction takes place directly between the hemiacetal and $PCl_3$, but the small amount of free alcohol present, due to the above mentioned equilibrium, is attacked immediately, forming dialkyl phosphite, an alkyl chloride and hydrogen chloride:

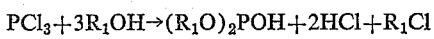

The dialkylphosphite formed immediately reacts with the free aldehyde, forming a dialkyl-hydroxyalkylphosphonate. The disappearance of free alcohol makes the equilibrium move to the right in the above mentioned hemiacetal decomposition equation until the available alcohol is consumed. In this reaction, the dialkyl phosphite is protected from attack by hydrogen chloride by the fact that the dialkyl phosphite is transformed immediately into the much more stable dialkylhydroxyalkyl phosphonate, so that at no time is any appreciable amount of the dialkyl phosphite exposed to the action of the hydrogen chloride. An additional safety factor is provided by the relatively low solubility of hydrogen chloride in the reaction mixture, the concentration of dissolved hydrogen chloride being low at all times. If desired, solvents such as benzene, toluene, xylene, hexane, etc. can be used as medium for this reaction, which would decrease the solubility of HCl even further. It is therefore possible to carry on this reaction at such relatively high temperatures as 40° C. and higher; at these temperatures, the classical reaction between $PCl_3$ and alcohol would result in an extremely low yield. An added advantage of carrying out the several steps, in effect, in one reaction, is that temperature control can be maintained more readily than in the two classical reactions of dialkylphosphite formation and the condensation of that compound with a carbonyl compound, since the exothermicity of these reactions is counterbalanced to a great extent by the endothermic hemiacetal decomposition and the evaporation of the $R_1Cl$ and hydrogen chloride.

As has been mentioned previously, the ester I can be reacted with mild alkali to obtain the phosphate II. This can be done without an intermediate purification of I and, in fact, it has been found undesirable to purify I since some of the alkene phosphate is formed directly by reaction between the $PCl_3$ and the alcoholate of the halo aldehyde. The probable mechanism is much like that of formation of the phosphonate, except that here, the triphosphite intermediate instead of reacting with HCl to form the diphosphite and alkyl halide reacts with the aldehyde to form the alkene phosphate. Since the crude reaction product of the $PCl_3$, aldehyde, alcohol reaction contains, in addition to the phosphonate, the alkene phosphate, it is advantageous to use it in the next step rather than to first purify the phosphonate, which is a completely unexpected finding.

The following examples illustrate further the practice of the present invention.

*Example 1.*—Chloral methanolate was prepared in the usual manner by pouring an equimolar amount of chloral into methanol with cooling and stirring. Thereupon, a mole of $PCl_3$ was added to three moles of chloral methanolate with stirring at 40° without heating or cooling, since the temperature was practically constant throughout the addition. After the completion of addition, the mixture was heated to its boiling point, preferably under reduced pressure. A mole of methyl chloride and two moles of hydrogen chloride were collected in appropriate traps. Two moles of chloral were then distilled over, leaving as a residue the crude dimethyl trichloroethane hydroxyphosphonate. It was recrystallized to yield a pure product having a melting point of 78.4–79.7° C.

*Example 2.*—If desired, the chloral distillation employed in Example 1 can be avoided by reacting the liberated chloral in situ. In order to achieve this, the batch is cooled to 25–30° and two moles of methanol are added under stirring and cooling to form additional hemiacetal. Thereupon, the batch is heated to 40° and 2/3 mole $PCl_3$ are added. After end of addition, the batch is cooled to 25–30° and 4/3 mole methanol added, as described above, followed by addition of 4/9 mole $PCl_3$, and so on until the excess chloral present is reduced to a negligible minimum and chloral recovery by distillation is no longer required. It is also possible to add simultaneously two moles of methanol and one mole of $PCl_3$ to one mole of chloral methanolate.

*Example 3.*—To three moles of alpha, alpha, beta tribromo-n-butyraldehyde mono-n-butylacetal, prepared in a known way by heating n-butanol and bromine in an autoclave to 100° C., a mole of $PCl_3$ was added at 60° C. After completion of the addition, two moles of tribromobutylaldehyde were distilled off in vacuum, leaving a residue of crude dibutylhydroxytribromobutanephosphonate:

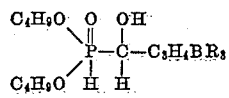

*Example 4.*—The crude residue of dimethyl trichloroethane hydroxyphosphonate obtained as in Example 1 was dissolved in twice its weight of water and 25% NaOH was added under stirring and cooling to maintain the temperature at 25° C. until the reaction mixture remained definitely alkaline to phenolphthalein for five minutes.

Thereupon, the organic layer was separated from the aqueous layer and the latter was extracted once with chloroform. The chloroform extract was added to the organic layer, the chloroform distilled off and the remaining residue consisted of crude dimethyl di-chlorovinylphosphate:

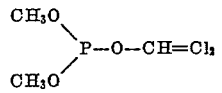

This was purified by distilling it in vacuum. The overall yield of all reactions was about 35% of theory.

*Example 5.*—The crude dibutyl-hydroxytribromobutyl-phosphonate obtained as in Example 3 was slurried in four times its weight of water and sufficient of a 25% aqueous NaOH solution was added under stirring and cooling below 25° C. Then the agitation was interrupted, the mixture allowed to settle, the organic layer separated, and the aqueous layer extracted once with chloroform, the chloroform extract being joined with the main organic layer. The chloroform was evaporated under reduced pressure, leaving a residue of crude dibutyl dibromobutenephosphate:

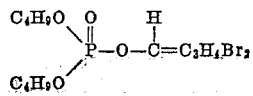

We claim:

1. In the preparation of esters of hydroxy phosphonic acids of the general formula:

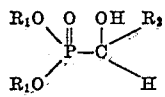

and alkene phosphates of the general formula:

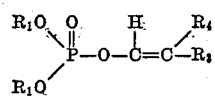

wherein $R_1$ is lower alkyl and $R_2$ is a member of the group consisting of lower alkyl and halo-substituted lower alkyl and wherein $R_3$ and $R_4$ are members selected from the group consisting of hydrogen, a halogen, a lower alkyl radical and a halohydrin substituted lower alkyl radical, the step comprising reacting $PCl_3$ and a hemiacetal of the general formula:

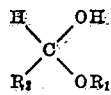

wherein $R_1$ and $R_2$ are as aforesaid.

2. In the preparation of an ester of a hydroxy phosphonic acid of the general formula:

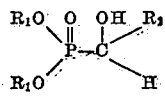

wherein $R_1$ is lower alkyl and $R_2$ is a member of the class consisting of lower alkyl and halo-substituted lower alkyl, the steps comprising: reacting about three moles of a lower alkyl alcohol and at least one mole of a member of the group consisting of lower alkyl aldehydes and halo-substituted lower alkyl aldehydes with about one mole of $PCl_3$.

3. In the preparation of an ester of a hydroxy phosphonic acid of the general formula:

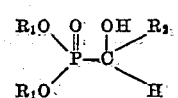

wherein $R_1$ is lower alkyl and $R_2$ is a member of the class consisting of lower alkyl and halo-substituted lower alkyl, the steps of forming a hemiacetal of the formula:

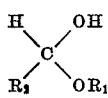

by mixing a member of the class consisting of lower alkyl aldehydes and halo-substituted lower alkyl aldehydes with a lower alkyl alcohol; and reacting said hemiacetal so formed with $PCl_3$ to form said ester of a hydroxy phosphonic acid.

4. The process of claim 3 wherein the aldehyde is chloral.

5. The rocess of claim 3 wherein the aldehyde is chloral and the alcohol is methanol.

6. A process according to claim 3 wherein alcohol is added to transform liberated aldehyde into a hemiacetal, $PCl_3$ is added to react with the hemiacetal and wherein the addition of alcohol and $PCl_3$ is continued until substantially all of the excess aldehyde has been transformed into hydroxyphosphonic acid ester.

References Cited in the file of this patent
UNITED STATES PATENTS
2,579,810     Fields _____ Dec. 25, 1951

OTHER REFERENCES

Lorenz et al.: "J. Am. Chem. Soc.," Vol. 77, pages 2554–2556 (1955).